United States Patent
Sebastian et al.

(10) Patent No.: US 9,819,056 B2
(45) Date of Patent: Nov. 14, 2017

(54) METHOD FOR OPERATING A RECHARGEABLE BATTERY

(71) Applicant: Robert Bosch GmbH, Stuttgart (DE)

(72) Inventors: Georg Sebastian, Marbach (DE); Michael Gansemer, Kirchheim (DE); Julian Nolan, Pully (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/313,282

(22) PCT Filed: Apr. 27, 2015

(86) PCT No.: PCT/EP2015/059086
§ 371 (c)(1),
(2) Date: Nov. 22, 2016

(87) PCT Pub. No.: WO2015/180911
PCT Pub. Date: Dec. 3, 2015

(65) Prior Publication Data
US 2017/0187074 A1    Jun. 29, 2017

(30) Foreign Application Priority Data
May 28, 2014    (DE) .................. 10 2014 210 187

(51) Int. Cl.
*H01M 10/44* (2006.01)
*H01M 10/42* (2006.01)
*B60L 11/18* (2006.01)

(52) U.S. Cl.
CPC ..... *H01M 10/4207* (2013.01); *B60L 11/1851* (2013.01); *H01M 10/425* (2013.01);
(Continued)

(58) Field of Classification Search
CPC .......... H01M 10/4207; H01M 10/425; H01M 2010/4271; H01M 2220/20; B60L 11/1851; B60L 2200/32
See application file for complete search history.

(56) References Cited

U.S. PATENT DOCUMENTS 5,111,132 A * 5/1992 Motose ................. H02J 7/1423
                                                                  320/125
5,601,940 A    2/1997 Denecke
(Continued)

FOREIGN PATENT DOCUMENTS

CN    102593400 A    7/2012
EP    1 641 066 A2    3/2006
(Continued)

OTHER PUBLICATIONS

International Search Report corresponding to PCT Application No. PCT/EP2015/059086, mailed Jul. 9, 2015 (German and English language document) (7 pages).
(Continued)

*Primary Examiner* — Raymond Alejandro
(74) *Attorney, Agent, or Firm* — Maginot, Moore & Beck LLP

(57) ABSTRACT

A method for operating a secondary battery which comprises multiple interconnected, bridgeable battery subunits and is situated in a compartment of an electrically driven vehicle, in particular a watercraft, includes detecting an accessibility of each battery subunit, and activating the battery subunits in accordance with the accessibility of the particular battery subunits.

6 Claims, 2 Drawing Sheets

(52) U.S. Cl.
CPC .. *B60L 2200/32* (2013.01); *H01M 2010/4271* (2013.01); *H01M 2220/20* (2013.01)

(56) References Cited

U.S. PATENT DOCUMENTS

| | | | |
|---|---|---|---|
| 6,643,122 | B1 | 11/2003 | Fontana et al. |
| 2014/0046536 | A1 | 2/2014 | Iguchi |
| 2014/0141287 | A1 | 5/2014 | Bertucci et al. |
| 2014/0255748 | A1* | 9/2014 | Jan .................. H01M 2/202 |
| | | | 429/120 |
| 2014/0287283 | A1* | 9/2014 | Kimpara ............ H01M 2/1094 |
| | | | 429/53 |

FOREIGN PATENT DOCUMENTS

| | | |
|---|---|---|
| EP | 2 605 307 A1 | 6/2013 |
| JP | 11-341608 A | 12/1999 |
| JP | 2009-277394 A | 11/2009 |
| JP | 2012-34476 A | 2/2012 |
| KR | 10-2013-0060801 A | 6/2013 |
| KR | 10-2013-0130949 A | 12/2013 |
| WO | 2011/065639 A1 | 6/2011 |
| WO | 2012/133274 A1 | 10/2012 |
| WO | 2013/014930 A1 | 1/2013 |

OTHER PUBLICATIONS

Det Norske Veritas AS (DNV); Tentative Rules for Battery Power; Ships/High Speed, Light Craft and Naval Surface Craft; Jan. 2012; Part 6, Chapter 28, Section 8; DNV, www.dnv.com (17 Pages).

* cited by examiner

METHOD FOR OPERATING A RECHARGEABLE BATTERY

This application is a 35 U.S.C. § 371National Stage Application of PCT/EP2015/059086, filed on Apr. 27, 2015, which claims the benefit of priority to Serial No. DE 10 2014 210 187.5, filed on May 28, 2014 in Germany, the disclosures of which are incorporated herein by reference in their entirety.

BACKGROUND

In electrically driven vehicles, in particular watercraft, battery systems having a multiplicity of electrically interconnected secondary battery cells are used, in particular in order to supply electrical drive mechanisms of the vehicles with electrical energy. For this purpose, a secondary battery, which is formed from the secondary battery cells, of a battery system is situated in a compartment on a vehicle, which is provided for said secondary battery.

As is found, e.g., in the publication "Tentative Rules for Battery Power", DNV Chips/Highspeed, Light Craft and Navels Surface Craft, Part 6, Chapter 28, considerations are made with respect to the design of battery compartments of watercraft. Such considerations relate to the safety of the crew, the watercraft, and the passengers, and are regularly documented in a hazard assessment which includes multiple steps, such as, e.g., ascertaining hazards and evaluating risks with respect to a battery compartment.

Corresponding considerations have also been made in the automotive sector, as is described, e.g., in CN 102593400 A which describes a system for a secondary battery, according to which the secondary battery can be installed in a vehicle in such a way that the secondary battery is easily accessed for maintenance.

Further considerations have also been made in the field of large battery packs for electric power storage facilities, as shown, e.g., in JP 2009 277394 A. According to these considerations, battery housings are used and are designed in such a way that secondary battery cells situated in the battery housings are accessible in order to be maintained, wherein the battery housings also have suitable properties of thermal radiation.

WO 2011/065639 A1 discloses a battery pack which is intended to allow for simple installation and manufacturing of a battery by providing a row of battery compartments, into which complete secondary batteries or secondary battery cells can be inserted.

Making a repair to battery systems can be difficult in watercraft, in particular, since, due to the limitations of a physical design of a watercraft, some battery cells of a secondary battery or subunits of the secondary battery formed from battery cells are very likely located in areas of a battery compartment of the watercraft which are difficult for maintenance personnel to access. Other battery cells or subunits of the secondary battery can be located in more easily accessed areas of the battery compartment, however.

In a marine environment, the accessibility and the maintenance of a battery system is associated with a number of specific difficulties which are due, inter alia, to the particular size of a battery system which can include twelve or more subunits, the required long service life of the battery system, the requirement that a number of operating requirements be satisfied, many of which can exceed recommended operating limits of a battery system for an optimal service life and power, e.g., in a hazard situation of a watercraft, and the site of a battery system in the watercraft, which can be located in hard-to-access areas of the watercraft.

SUMMARY

The subject matter of the disclosure is a method for operating a secondary battery which comprises multiple interconnected, bridgeable battery subunits and is situated in a compartment of an electrically driven vehicle, in particular a watercraft, characterized in that the accessibility of each battery subunit is detected, and the battery subunits are activated in accordance with the accessibility of the particular battery subunits.

According to the disclosure, the accessibility of the particular battery subunits is taken into account during the operation of the secondary battery, for the purpose of which the accessibility of the particular battery subunits is ascertained. This accessibility can be ascertained by performing measurements or theoretical calculations.

The accessibility of a battery subunit of a secondary battery located in a compartment of a vehicle is a measure of the effort which is required for exchanging the battery subunit or performing maintenance thereon. This effort can be measured in the form of one or multiple parameters, such as, e.g., the amount of time which will be required, or the costs or the like which will be required. According to the disclosure, battery subunits are therefore classified according to how efficiently they can be exchanged or maintained. For example, a battery subunit can have a low value for accessibility if it can be directly accessed by maintenance personnel without special equipment. A higher value for the accessibility of a battery subunit can be present if the battery subunit can be accessed by maintenance personnel via limited crawl spaces, which can, e.g., double the time required for performing maintenance. A high value for the accessibility of a battery subunit can result when the battery subunit can be accessed exclusively by using special equipment for at least partially dismantling the secondary battery.

A value for the accessibility of a battery subunit of a secondary battery located in a compartment of a vehicle can be theoretically ascertained by using a number of criteria which can include, e.g., start-up data detected during a test run, CAD data which includes, e.g., the outline of the battery compartment with the positioning or accommodation of the battery subunit, or manually input data. A battery manufacturer can request special classes of accessibility to the battery subunits, which represent different defined possibilities for the accessibility of battery subunits and which can be incorporated into a development process of a watercraft.

The values for the accessibility of the battery subunit of a secondary battery located in a compartment of a vehicle can be stored in a database which can be part of an operating system which is connected to a network which can be accessed by a battery management system, a battery manufacturer, helmsmen, ship owners, or the like.

Within the scope of the disclosure, a battery subunit can be a single battery cell, a series connection of multiple bridgeable battery cells, or a battery module comprising multiple interconnected, bridgeable battery cells. The battery subunits can be controlled and/or regulated individually. Every battery subunit can be designed to be electrically insertable into the secondary battery or separable therefrom (bridged), for the purpose of which suitable switching means can be provided. Such switching means can be part of a circuit for the dynamic balancing of a battery subunit.

In the database, fields can be sorted according to a specified number of criteria and can be brought into a sequence. A recorded value for the accessibility of a battery subunit can take up more than one field. All fields which have a value for the accessibility of a battery subunit can be used for establishing the rank of the particular assigned field within the sequence. For example, a field can be used for describing different performance grades of different battery types within a secondary battery. Quick-charging battery subunits can be distinguished from normally charging battery subunits within a secondary battery, and therefore the quick-charging battery subunits can be prioritized for a charging process when a recharging time or a recharging power is limited, such as, e.g., in the case of ferry boats which travel back and forth quickly.

In addition, for the operation of the secondary battery, the availability of each battery subunit can be detected, wherein an activation of the battery subunits additionally takes place in accordance with the availability of the particular battery subunits.

According to one advantageous embodiment, battery subunits having high accessibility are activated more frequently than battery subunits having low accessibility. For this purpose, an accessibility sequence of the battery subunits can be established on the basis of the accessibility of the particular battery subunits. Recordings of values of the accessibility of battery subunits can be classified according to the value of the particular associated field within a database. A classification can also take place dynamically if changes to the fields are likely. The result of the classification can be stored either as an additional field in a separate database, as an additional field for every record of an accessibility value, or as an alternative means for later use by a battery management system. If a secondary battery must be operated in a manner which is sub-optimal for the service life or other performance characteristics of its battery subunits, the utilization of the individual battery subunits can be controlled in such a way that battery subunits which are most easily accessed are prioritized during the activation of battery subunits. A 1:1 correlation between an ascertained accessibility sequence and a subsequent prioritization of battery subunits can be carried out as the simplest implementation. Other methods can utilize the accessibility sequence as an input variable in order to determine a correlation. A corresponding control of a secondary battery can be carried out, e.g., when a watercraft must carry out sounding in order to avoid a collision, including taking on/releasing ballast water, which causes the secondary battery to exceed recommended operating limits. In such a case, a charging/discharging of battery subunits which are most easily accessed can be prioritized. A battery management system can utilize the accessibility sequence in different ways for controlling a secondary battery.

According to one further advantageous embodiment, an activation sequence is established on the basis of the accessibility of the particular battery subunits and is taken into account during the activation of the battery subunits. The establishment of the activation sequence can be preceded by an identification of an accessibility sequence of the battery subunits on the basis of the ascertained accessibility of the battery subunits.

According to one further advantageous embodiment, an application-based scheme is created on the basis of the accessibility sequence and is taken into account during the activation of the battery subunits. When it is determined in advance that the watercraft requires electrical power, by means of which the secondary battery and, as a result, at least one battery subunit must be operated in a range which is sub-optimal for the service life or other performance characteristics of the secondary battery or the battery subunit, a scheme of the battery subunits must be ascertained. For example, requirements on a battery power for a watercraft for a certain voyage can be calculated in advance. In this case, a calculation can be performed, on the basis of which a charging capacity of the secondary battery and every individual battery subunit for the route of the voyage can be ascertained. One scheme of the battery subunits of a secondary battery can control the secondary battery in such a way that those battery subunits which are most easily accessed are prioritized first and are alternated with other battery subunits in such a way that the pre-calculated performance requirements of the watercraft are met and individual performance attributes of the secondary battery, which can include the battery service life, are optimized. A 1:1 correlation any other suitable correlation between the accessibility sequence of the battery subunits and subsequent prioritizations of the battery subunits can be utilized. One scheme of the battery subunits can also be calculated by using different user-specific classes of battery subunits. For example, those battery subunits which are most easily accessed, or the 10% of battery subunits located with easiest access can be defined as class 1, which are then prioritized and planned as a group, within which the battery subunits can alternate among themselves. Different optimization algorithms, such as, e.g., least mean squares, can be utilized for determining the composition of different classes of battery subunits, for determining the alternation of battery subunits within these classes, and for determining the alternation of battery subunits of different classes. For example, performance requirements for a voyage can be calculated for a route which includes a trip to a fjord in a region in which only battery power is permitted. In this case, 90% of the trip can be carried out using the secondary battery within recommended power limits. The remaining 10% of the trip, however, requires that the secondary battery be used outside of the recommended power limits. One scheme for battery subunits can be calculated by using the class of battery subunits which are most easily accessed. The battery subunits within this class can be alternated with battery subunits outside this class during the entire trip, whereby the operation of each battery subunit within the class can be maximized.

According to one further advantageous embodiment, a mathematical model of the compartment and the secondary battery to be located in the compartment is created, which is optimized in such a way that the battery subunits are arranged in the compartment with consideration for their particular accessibility, which results from the mathematical model, and with consideration for at least one particular characteristic of the battery subunits in the compartment. As a result, the accessibility of battery subunits of a secondary battery within a compartment of a vehicle can be taken into account even during the planning for the secondary battery. As a result, e.g., lower-cost battery subunits can be situated in an area of the compartment having greater accessibility, whereas higher-cost battery subunits can be situated in less easily accessed areas of the compartment. Subsequently, the lower-cost battery subunits can be activated more frequently than the higher-cost battery subunits. Characteristics of a battery subunit which can be taken into account are, e.g., the electrical capacitance, the costs, the calendar age, the state of health (SOH), the state of charge (SOC), the electric voltage, or the like, of the battery subunit. Due to the accessibility of the battery subunits of a secondary battery within a compartment of a vehicle, the temporary partial dismantling and operation of the secondary battery can be accounted for in the planning for the secondary battery. In this case, fewer battery subunits can be installed, e.g., for short trips, in order to increase the possible useful load. By the same token, a temporary swap-out for higher-power battery subunits for relatively long trips is possible.

The subject matter of the disclosure is also a battery system for an electrically driven vehicle, in particular a watercraft, comprising at least one secondary battery which includes multiple interconnected, bridgeable battery subunits and is situated in a compartment of the vehicle, and comprises at least one battery management system which is connected to the secondary battery for the purpose of communication, characterized in that the battery management system is designed for activating the battery subunits in accordance with their particular accessibility.

The advantages and embodiments mentioned above with reference to the method are therefore associated with this battery system.

BRIEF DESCRIPTION OF THE DRAWINGS

The disclosure is explained in the following, by way of example, with reference to the attached figures and on the basis of preferred exemplary embodiments, wherein the features presented in the following can depict an aspect of the disclosure individually or in different combinations with one another. In the drawings.

DETAILED DESCRIPTION

Figure 1:
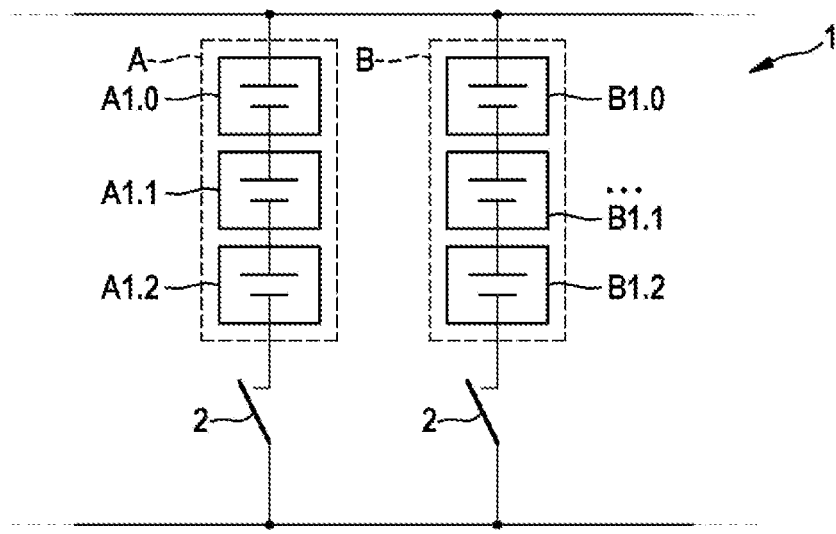
FIG. 1 shows a schematic illustration of one exemplary embodiment of a secondary battery according to the disclosure.

FIG. 1 shows a schematic illustration of one exemplary embodiment of a secondary battery 1 according to the disclosure. The secondary battery 1 includes multiple bridgeable battery subunits A, B, etc., in the form of cell strings of interconnected battery cells A1.0, A1.1, A1.2, B1.0, B1.1, B1.2, etc. Assigned to each battery subunit A, B, etc. is a switching means 2, via which the particular battery subunit A, B, etc. can be electrically connected and disconnected.

Figure 2:
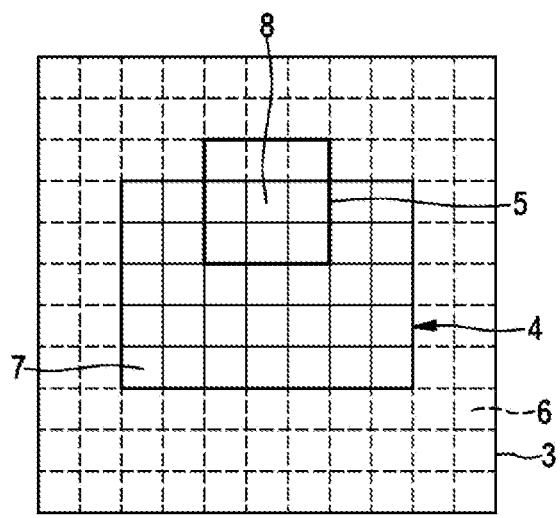
FIG. 2 shows a schematic illustration of one further exemplary embodiment of a secondary battery situated in a compartment of a vehicle.

FIG. 2 shows a schematic illustration of one further exemplary embodiment of a secondary battery 4 situated in a compartment 3 of a vehicle. An opening 5, through which the secondary battery 4 is accessible, is located on the compartment 3. The space within the compartment is subdivided into a multiplicity of sub-spaces 6. As indicated in FIG. 2, a battery subunit situated in the sub-space 7 is more difficult to access than a battery unit situated in the sub-space 8.

Figure 3:
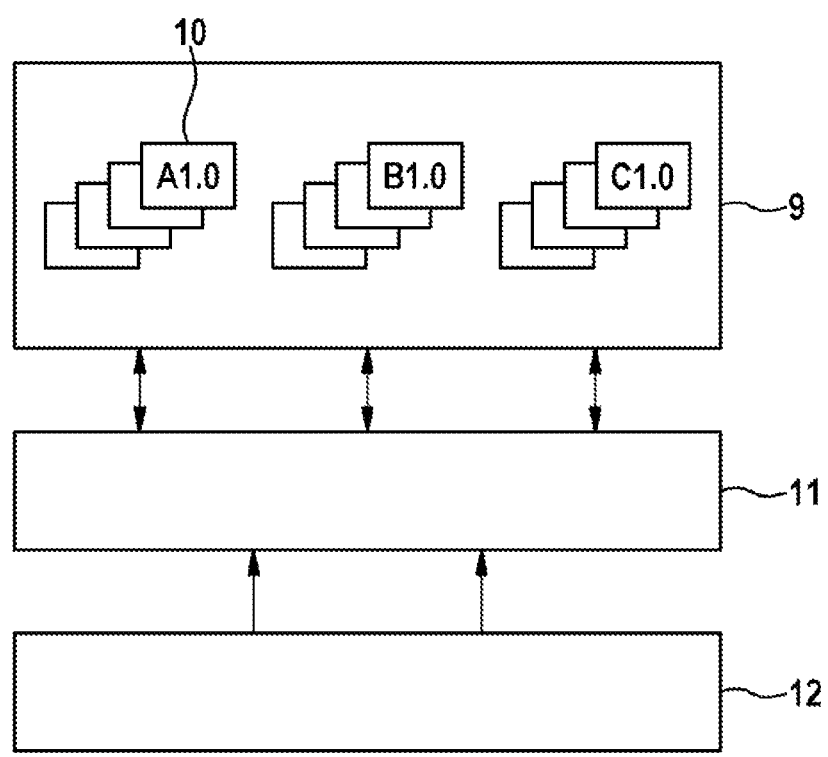
FIG. 3 shows a schematic illustration of one exemplary embodiment of an implementation of a method according to the disclosure.

FIG. 3 shows a schematic illustration of one exemplary embodiment of an implementation of a method according to the disclosure. A database 9 is evident, in which an element 10 for each battery cell A1.0, B1.0, C1.0, etc., is stored. Each element 10 can contain, e.g., fundamental parameters, such as the accessibility, the electrical capacitance, the costs, the age, the quick-chargeability, the battery cell type (Pb, NiMH, LiFeP, etc.), the history of use before installation, or the like, the particular battery cell A1.0, B1.0, C1.0, etc., and further parameters, such as the state of health (SOH), the state of charge (SOC), a shut-down request number, the electrical voltage, the history of use since installation, or the like, of the battery cell A1.0, B1.0, C1.0, etc.

A battery management system 11 can access the database 9 for selecting elements 10 from the database 9 by means of a suitable algorithm. The battery management system 11 can also store data in the database 9. In order to make the particular selection of the elements 10 from the database 9, the battery management system 11 utilizes external indicators 12, by means of which the utilization of battery subunits can be theoretically ascertained and established. Such an indicator can be, e.g., a planned trip route for a vehicle, a planned distance to be travelled by a vehicle, expected power requirements of a vehicle, the next maintenance/exchange interval, or the like.

The invention claimed is:

1. A method for operating a secondary battery which comprises multiple interconnected, bridgeable battery subunits and is situated in a compartment of an electrically driven vehicle comprising a watercraft, the method comprising:
   detecting an accessibility of each battery subunit; and
   activating the battery subunits in accordance with the detected accessibility of the particular battery subunits.

2. The method as claimed in claim 1, further comprising:
   activating battery subunits having high accessibility more frequently than battery subunits having low accessibility.

3. The method as claimed in claim 1, further comprising:
   establishing an activation sequence on the basis of the accessibility of the particular battery subunits; and
   taking into account the established activation sequence during the activation of the battery subunits.

4. The method as claimed in claim 3, further comprising:
   creating an application-based scheme on the basis of the activation sequence; and
   taking into account the application-based scheme during the activation of the battery subunits.

5. The method as claimed in claim 1, further comprising:
   creating a mathematical model of the secondary battery to be located in the compartment, the mathematical model optimized in such a way that the battery subunits are arranged in the compartment with consideration for their particular accessibility, which results from the mathematical model, and with consideration for at least one particular characteristic of the battery subunits.

6. A battery system for an electrically driven vehicle comprising a watercraft, the battery system comprising:
   at least one secondary battery which includes multiple interconnected, bridgeable battery subunits and is situated in a compartment of the vehicle; and
   at least one battery management system which is connected to the at least one secondary battery for the purpose of communication,
   wherein the battery management system is configured to activate the battery subunits in accordance with their particular accessibility.

* * * * *

UNITED STATES PATENT AND TRADEMARK OFFICE
CERTIFICATE OF CORRECTION

| | | |
|---|---|---|
| PATENT NO. | : 9,819,056 B2 | |
| APPLICATION NO. | : 15/313282 | |
| DATED | : November 14, 2017 | |
| INVENTOR(S) | : Sebastian et al. | |

It is certified that error appears in the above-identified patent and that said Letters Patent is hereby corrected as shown below:

On the Title Page

Item (72), the address of the first inventor, "Georg Sebastian," should read:
Inventors: Georg Sebastian, Marbach A.N. (DE);
        Michael Gansemer, Kirchheim (DE);
        Julian Nolan, Pully (CH)

Signed and Sealed this
Twenty-seventh Day of March, 2018

Andrei Iancu
*Director of the United States Patent and Trademark Office*